US012764530B2

(12) United States Patent
O'Connor et al.

(10) Patent No.: US 12,764,530 B2
(45) Date of Patent: Oct. 13, 2026

(54) SYSTEM AND METHOD FOR PROVISIONING MOBILE CREDENTIALS

(71) Applicant: TRANSACT CAMPUS INC., Scottsdale, AZ (US)

(72) Inventors: Shane O'Connor, Scottsdale, AZ (US); Raghu Rudra, Scottsdale, AZ (US); Dietmar Glenn Tonn, Scottsdale, AZ (US); Adan Estevan Perez, Scottsdale, AZ (US); James Stephen Sadlier, Scottsdale, AZ (US); Daniel Mel Farrell, Scottsdale, AZ (US); Praveen Talari, Scottsdale, AZ (US); Collen Nqabutho Ndlovu, Scottsdale, AZ (US)

(73) Assignee: ILLUMIA, LLC, Scottsdale, AZ (US)

( * ) Notice: Subject to any disclaimer, the term of this patent is extended or adjusted under 35 U.S.C. 154(b) by 449 days.

(21) Appl. No.: 18/196,067

(22) Filed: May 11, 2023

(65) Prior Publication Data

US 2024/0284175 A1 Aug. 22, 2024

Related U.S. Application Data

(60) Provisional application No. 63/446,559, filed on Feb. 17, 2023.

(51) Int. Cl.
*H04W 12/06* (2021.01)
*H04W 12/47* (2021.01)

(52) U.S. Cl.
CPC ......... *H04W 12/068* (2021.01); *H04W 12/47* (2021.01)

(58) Field of Classification Search
CPC ..... H04W 12/068; H04W 12/47; H04W 4/80; H04W 12/72; H04W 12/08; H04L 2463/102; G06Q 20/322
See application file for complete search history.

(56) References Cited

U.S. PATENT DOCUMENTS 8,112,330 B1 * 2/2012 Grandcolas ........ G06Q 20/3552 705/42
9,355,225 B2 * 5/2016 Soelberg ................ G06Q 30/06
(Continued)

OTHER PUBLICATIONS

Article from website, Monash University, "Monash University launches digital M-Pass ID", retrieved from the Internet on Feb. 28, 2024 at https://www.monash.edu/news/articles/monash-university-launches-digital-m-pass-id, Feb. 14, 2023 (2 pgs).
(Continued)

*Primary Examiner* — Lizbeth Torres-Diaz
(74) *Attorney, Agent, or Firm* — Stinson LLP

(57) ABSTRACT

A system and method for provisioning mobile credentials in digital wallets of mobile devices is disclosed. A mobile device uses an invocation URL to launch a micro application that performs the mobile credential provisioning process. In some embodiments, the micro application is configured for use by users associated with a plurality of different institutions and optional service portals. In this case, the invocation URL includes a unique parameter that identifies an institution and optional service portal so that the mobile device is able to customize the login experience for each institution. As such, users associated with different institutions and optional service portals are able to quickly provision mobile credentials without having to access an application store and locate, download and install a mobile application and then go through a cumbersome institution/service portal selection process just to perform this single task.

40 Claims, 16 Drawing Sheets

(56) References Cited

U.S. PATENT DOCUMENTS

| | | | | |
|---|---|---|---|---|
| 10,963,865 | B1 * | 3/2021 | Rule | G07F 7/125 |
| 11,901,970 | B1 * | 2/2024 | Lutz | H04B 5/77 |
| 12,332,439 | B2 * | 6/2025 | Mayrand | G06F 3/011 |
| 2001/0027446 | A1 * | 10/2001 | Metcalfe | G06Q 40/00 705/67 |
| 2006/0136829 | A1 * | 6/2006 | Abbar | G06F 9/451 715/744 |
| 2009/0319921 | A1 * | 12/2009 | Abel | G06F 40/174 715/760 |
| 2010/0191701 | A1 * | 7/2010 | Beyda | G06Q 10/06 715/738 |
| 2012/0166976 | A1 * | 6/2012 | Rauh | G06F 8/38 715/762 |
| 2012/0174189 | A1 * | 7/2012 | Lim | G06F 21/88 726/26 |
| 2014/0282153 | A1 * | 9/2014 | Christiansen | G06Q 30/0201 715/765 |
| 2015/0066691 | A1 | 3/2015 | Ready et al. | |
| 2016/0328707 | A1 * | 11/2016 | Wagner | G06Q 20/322 |
| 2017/0346822 | A1 * | 11/2017 | Castinado | H04W 12/06 |
| 2018/0211248 | A1 * | 7/2018 | Sims | G06Q 20/3672 |
| 2018/0211249 | A1 * | 7/2018 | Sims | G06Q 20/3672 |
| 2018/0211308 | A1 * | 7/2018 | Cheeks | G06Q 30/0613 |
| 2018/0276657 | A1 | 9/2018 | Cho et al. | |
| 2019/0057364 | A1 | 2/2019 | Andrews et al. | |
| 2021/0357912 | A1 * | 11/2021 | Rule | G07F 7/125 |
| 2022/0108304 | A1 | 4/2022 | Glynn-Udrow et al. | |
| 2022/0335412 | A1 * | 10/2022 | Rule | G06F 16/955 |
| 2023/0083220 | A1 * | 3/2023 | Salama | H04W 12/069 705/41 |
| 2023/0169505 | A1 * | 6/2023 | Rule | G06Q 20/42 705/64 |
| 2025/0124512 | A1 * | 4/2025 | Humpherys | G06Q 40/08 |

OTHER PUBLICATIONS

Website, Apple Store Preview, "Transact eAccounts. Transact Campus Inc", retrieved from the Internet on Mar. 20, 2024 at https://apps.apple.com/us/app/transact-eaccounts/id1493974212, (3 pgs) (Applicant states that the product described in the document was publicly used before the effective U.S. filing date of this application.).

Website, Google Play, "Transact eAccounts. Transact Campus Inc", retrieved from the Internet on Mar. 20, 2024 at https://play.google.com/store/apps/details?id=com.blackboard.transact.android.v2&hl=en_US&gl=US&pli=1, (4 pgs) (Applicant states that the product described in the document was publicly used before the effective U.S. filing date of this application.).

Website, Transact Holdings Inc., "Apple Wallet User Guide & FAQs", retrieved from the Internet on Feb. 28, 2024 at https://transactcampus.com/engagement/mobile-credential/apple, (4 pgs) (Applicant states that the product described in the document was publicly used before the effective U.S. filing date of this application.).

Website, Transact Holdings Inc., "Campus Life, Reimagined. Colleges and Universities are embracing our mobile-first products", retrieved from the Internet on Feb. 28, 2024 at https://marketing.transactcampus.com/experience-transact?utm_source=google&utm_medium=cpc&utm_campaign=brand&utm_term=campus-solutions&utm_content=brand-campaign&utm_campaign=&utm_source=google&utm_medium=cpc&utm_term=transact%20campus&hsa_acc=2455299042&hsa_cam=19459533046&hsa_grp=145267968215&hsa_ad=651078792478&hsa_.

Website, Google Play Help, "Use Play Instant Apps", retrieved from the Internet on Feb. 28, 2024 at https://support.google.com/googleplay/answer/7683278?hl=en%23zippy=#zippy=%2Chow-play-instant-apps-work%2Csee-your-recent-instant-apps%2Cinstall-an-app%2Cclear-the-data-for-a-specific-instant-app%2Cmanage-permissions-for-instant-apps, (2 pgs) (Applicant states that the product described in the document was publicly used before the effective U.S. filing date of this application.).

Website, Apple Developer, "App Clips", retrieved from the Internet on Feb. 28, 2024 at https://developer.apple.com/app-clips/, (5 pgs) (Applicant states that the product described in the document was publicly used before the effective U.S. filing date of this application.).

Website, Transact Holdings Inc., "Transact Stored Value", retrieved from the Internet on Mar. 26, 2024 at https://transactcampus.com/solutions/campus-id/ (1 pg) (Applicant states that the product described in the document was publicly used before the effective U.S. filing date of this application.).

Transfer of payment credentials between devices; An IP.com Prior Art Database Technical Disclosure; Authors et. al.: Disclosed without attribution; IP.com No. IPCOM00053207D; IP.com Electronic Publication Date: Mar. 14, 2018 (Year: 2018).

* cited by examiner

SYSTEM AND METHOD FOR PROVISIONING MOBILE CREDENTIALS

CROSS-REFERENCE TO RELATED APPLICATIONS

This application is based on and claims priority to U.S. Provisional Patent Application Ser. No. 63/446,559 filed on Feb. 17, 2023, which is incorporated herein by reference in its entirety.

STATEMENT REGARDING FEDERALLY SPONSORED RESEARCH OR DEVELOPMENT

Not applicable.

STATEMENT REGARDING JOINT RESEARCH AGREEMENT

Not applicable.

BACKGROUND OF THE INVENTION

Electronic account management systems enable users to manage electronic accounts via mobile applications on their mobile devices. Some of these mobile applications are designed for use by users associated with different institutions. In practice, a user must locate the appropriate mobile application in an application store and then download and install the mobile application on the user's mobile device. The mobile application prompts the user to select an institution, select a service portal, and enter login credentials (e.g., username and password). Once logged in, the user is presented with an interface that enables the user to perform a number of different tasks associated with the selected institution and service portal.

While existing mobile applications for managing electronic accounts have been widely adopted, they do have certain drawbacks. For example, some users are hesitant or unwilling to download and install a mobile application that will take up space on their mobile devices. Also, some users find the institution/service portal selection process to be cumbersome, particularly in cases where a user wants to quickly perform a single task. Thus, there remains a need in the art for technological solutions that overcome these drawbacks and/or that offer other advantages compared to existing electronic account management systems.

BRIEF SUMMARY OF THE INVENTION

The present invention is directed to a system and method for provisioning mobile credentials in digital wallets of mobile devices. A mobile device uses an invocation Uniform Resource Locator (URL) to launch a micro application that performs the mobile credential provisioning process. In some embodiments, the micro application is configured for use by users associated with a plurality of different institutions and optional service portals. In this case, the invocation URL used to launch the micro application includes a unique parameter that identifies an institution and optional service portal so that the mobile device is able to customize the login experience for each participating institution. As such, users associated with different institutions and optional service portals are able to quickly provision mobile credentials without having to access an application store and locate, download and install a mobile application and then go through a cumbersome institution/service portal selection process just to perform this single task.

Various embodiments of the present invention are described in detail below, or will be apparent to one skilled in the art based on the disclosure provided herein, or may be learned from the practice of the invention. It should be understood that the above brief summary of the invention is not intended to identify key features or essential components of the embodiments of the present invention, nor is it intended to be used as an aid in determining the scope of the claimed subject matter as set forth below.

BRIEF DESCRIPTION OF THE DRAWINGS

A detailed description of various exemplary embodiments of the present invention is provided below with reference to the following drawings, in which.

DETAILED DESCRIPTION OF EXEMPLARY EMBODIMENTS

Figure 1:
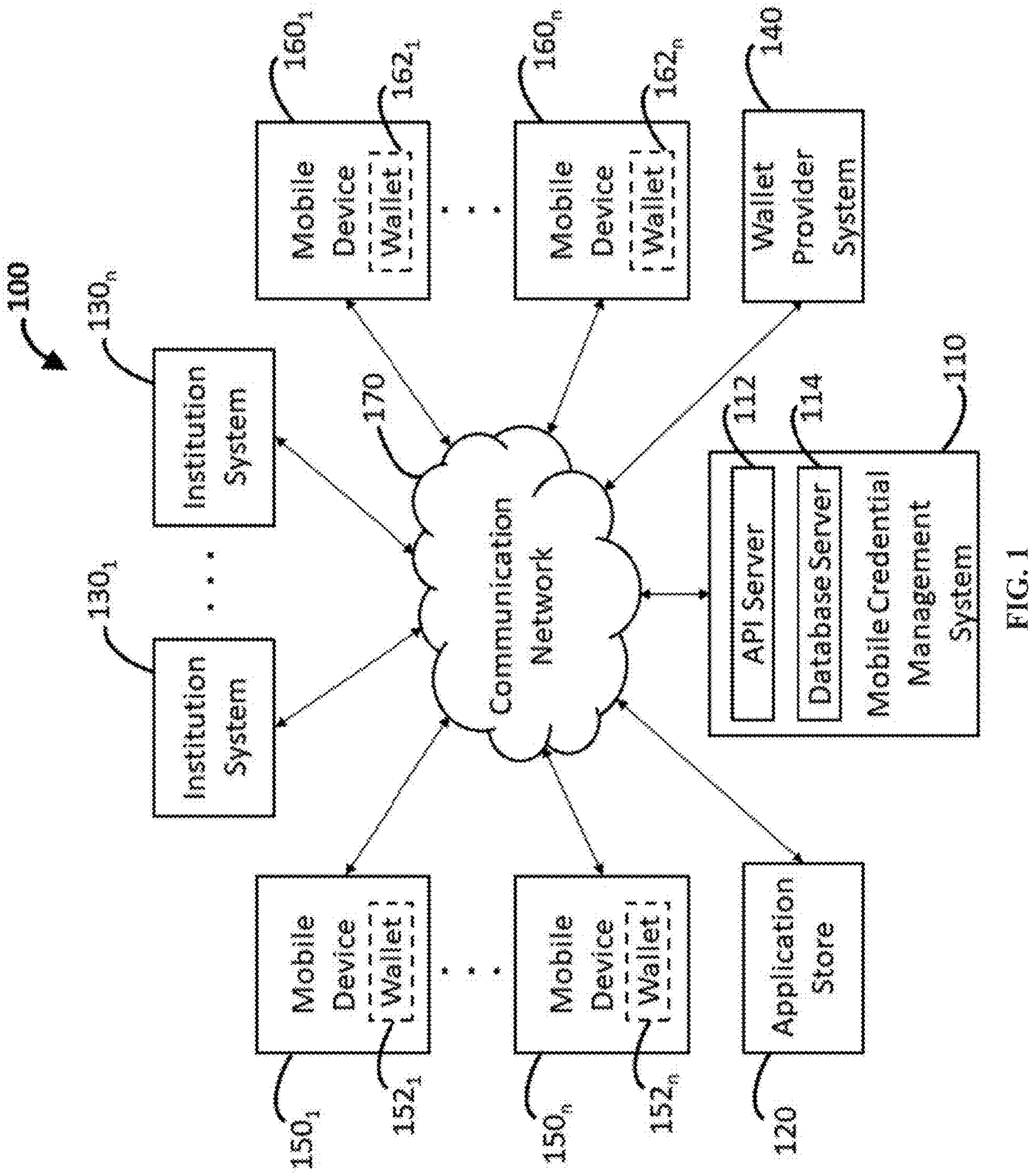
FIG. 1 is a network diagram of one embodiment of a system for provisioning mobile credentials in accordance with the invention.

The present invention is directed to a system and method for provisioning mobile credentials in digital wallets of mobile devices. While the invention will be described in detail below with reference to various exemplary embodiments, it should be understood that the invention is not limited to the specific configuration or methodologies of any of these embodiments. In addition, although the exemplary embodiments are described as embodying several different inventive features, one skilled in the art will appreciate that any one of these features could be implemented without the others in accordance with the invention.

In the present disclosure, references to "one embodiment," "an embodiment," "an exemplary embodiment," or "embodiments" mean that the feature or features being described are included in at least one embodiment of the invention. Separate references to "one embodiment," "an embodiment," "an exemplary embodiment," or "embodiments" in this disclosure do not necessarily refer to the same embodiment and are also not mutually exclusive unless so stated and/or except as will be readily apparent to one skilled in the art from the description. For example, a feature, structure, function, etc. described in one embodiment may also be included in other embodiments, but is not necessarily included. Thus, the present invention can include a variety of combinations and/or integrations of the embodiments described herein.

In general terms, the system and method of the present invention utilizes a micro application (referred to herein as a "micro-app") to provision mobile credentials in digital wallets of mobile devices. The micro-app comprises an application that is programmed to perform a single task—provisioning a mobile credential—without requiring the user to access an application store and locate, download and install a mobile application on a mobile device. The mobile credential comprises a unique identifier that is stored in the digital wallet of a mobile device, such as an electronic identification (ID) card that is used for access control (e.g., unlocking doors) and/or payments from a stored value account (e.g., pre-paid meal plans or other prepaid goods and services).

The micro-app may be launched by the user in a variety of different ways, such as scanning a machine-readable code (e.g., a standard barcode, a quick response (QR) code, a code specific to a digital distribution platform (such as an App Clip Code®), or any other type of machine-readable code known in the art), tapping or placing the mobile device near a Near-Field Communication (NFC) tag, or clicking a link or button on a user interface (e.g., a web page) displayed on the mobile device, in order to invoke a Uniform Resource Locator (URL) associated with the micro-app. In each case, the mobile device uses the URL to initiate the process of retrieving the micro-app from a digital distribution platform capable of storing and distributing micro-apps to mobile devices (e.g., an application store) and loading the micro-app on the mobile device-all without any further action by the user. Of course, other types of launching mechanisms that are now known or later developed may be used within the scope of the present invention, including, for example, near sharing, quick sharing, and geofencing technologies.

In some embodiments, the micro-app comprises a lightweight version of a full mobile application that may be downloaded and installed on the mobile device by a user. While the micro-app only enables a user to provision a mobile credential in a digital wallet of the user's mobile device, the full mobile application enables the user to perform a plurality of different tasks (one of which may be provisioning a mobile credential). The size of the micro-app is significantly smaller than that of the full mobile application, e.g., the micro-app's uncompressed size is preferably 20 megabytes or less, more preferably 15 megabytes or less, and most preferably 10 megabytes or less. As such, the micro-app will load on a mobile device in a relatively short period of time. Also, unlike the full mobile application, the user does not have to access an application store and locate, download and install the micro-app on the mobile device (as discussed above) and, in addition, the user does not have to take any action to delete the micro-app from the mobile device once the mobile credential has been provisioned. Rather, the micro-app will only reside on the mobile device for a short period of time and will eventually be unloaded in the device's memory without any user action i.e., the operating system of the mobile device transparently downloads the micro-app and manages its life cycle. One skilled in the art will appreciate that, in some cases, use of the micro-app may drive use of the mobile credential and even adoption of the full mobile application.

In some embodiments, the micro-app is configured for use by users associated with a specific institution and optionally a service portal associated with the institution. In this case, the invocation URL used to launch the micro-app identifies the institution and optional service portal so that the mobile device is able to load the appropriate micro-app. As such, users are able to quickly provision mobile credentials without having to access an application store and locate, download and install a mobile application just to perform this single task.

In other embodiments, the micro-app is configured for use by users associated with a plurality of different institutions and optional service portals associated with those institutions—e.g., the same micro-app is loaded by users associated with Institution A, users associated with Institution B, users associated with Institution C, etc. In this case, the invocation URL used to launch the micro-app includes a unique parameter that identifies the institution and optional service portal so that the mobile device is able to customize the login experience for each participating institution. As such, users associated with different institutions and optional service portals are able to quickly provision mobile credentials without having to access an application store and locate, download and install a mobile application and then go through a cumbersome institution/service portal selection process just to perform this single task.

An exemplary embodiment of the present invention will now be described in which a mobile credential management system supports use of the same micro-app by users associated with different institutions and associated service portals. Each user is able to use his mobile device to launch the micro-app simply by scanning a machine-readable code, reading an NFC tag, selecting a link or button on a user interface (e.g., a web page), etc. The unique parameter in the invocation URL enables the mobile device to display a user interface, such as a login card or login screen, that has been customized for the appropriate institution and service portal. The user is then able to enter his login credentials and quickly provision a mobile credential in the digital wallet of his mobile phone. It should be understood that this embodiment is provided in order to describe the various capabilities of the invention and not to limit the scope of the invention.

Mobile Credential Provisioning System

Referring to FIG. 1, one embodiment of a system for provisioning mobile credentials in digital wallets of mobile devices in accordance with the present invention is shown generally as reference number 100. System 100 includes a plurality of network elements-including a mobile credential management system 110, an application store 120, a plurality of institution systems 130$_1$-130$_n$, a digital wallet provider system 140, mobile devices 150$_1$-150$_n$ associated with institution system 130$_1$, and mobile devices 160$_1$-160$_n$ associated with institution system 130$_n$-which communicate with each other via a communication network 170, as described in greater detail below.

In this embodiment, mobile credential management system 110 comprises an API server 112 in communication with a database server 114. Mobile credential management system 110 is accessible by each of mobile devices 150$_1$-150$_n$ and mobile devices 160$_1$-160$_n$ via communication network 170. As discussed below, each mobile device executes a micro-app that includes a plurality of application programming interfaces (APIs) that send data requests to API endpoints of API server 112, and API server 112 responds by providing data that enables the micro-app to facilitate the provisioning of a mobile credential in the digital wallet of the mobile device.

Figure 2:
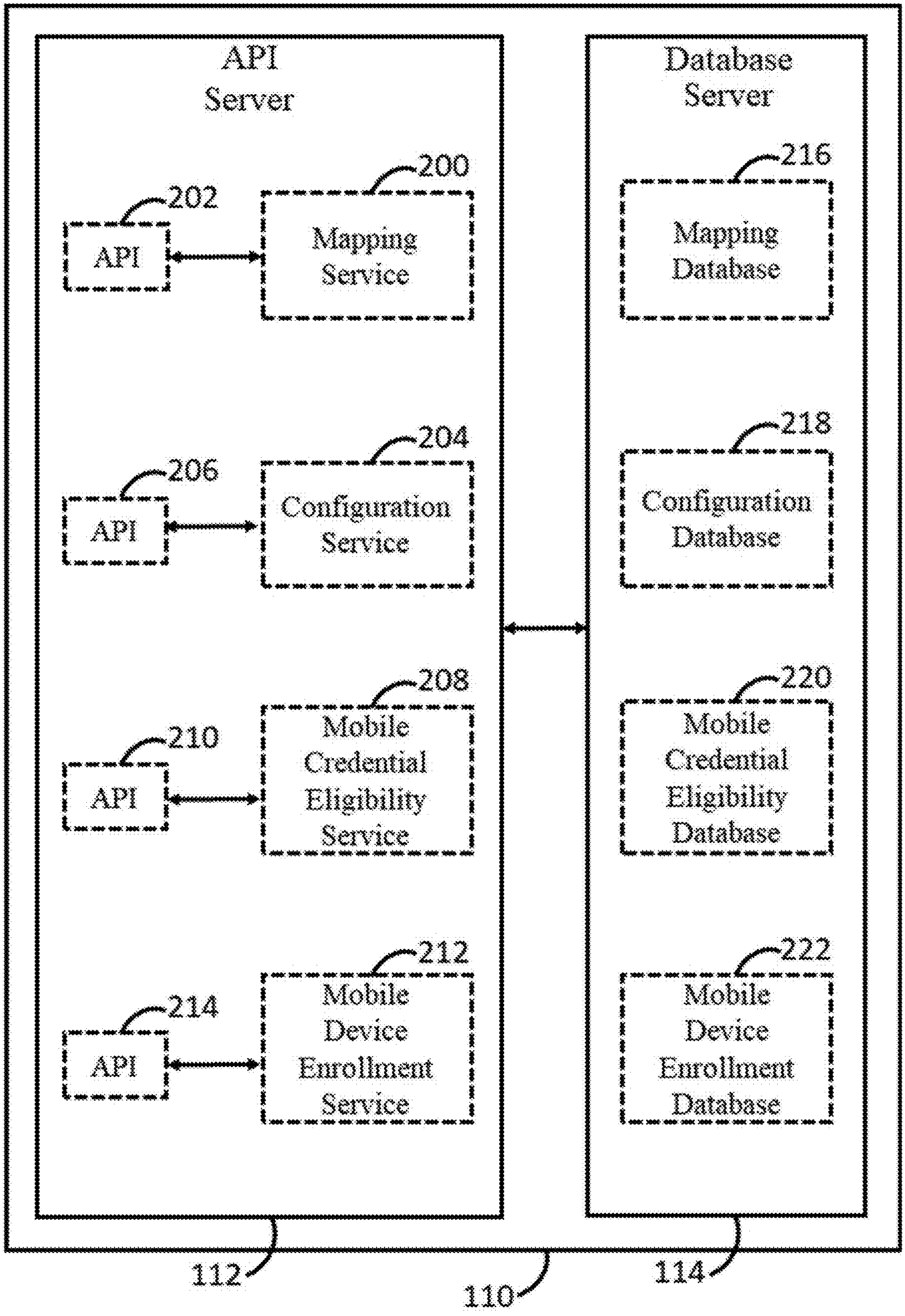
FIG. 2 is a block diagram of the mobile credential management system shown in FIG. 1.

As shown in FIG. 2, API server 112 provides access to a number of different microservices that can be accessed through API endpoints, including: a mapping service 200 that is accessible through API endpoint 202; a configuration service 204 that is accessible through API endpoint 206; a mobile credential eligibility service 208 that is accessible through API endpoint 210; and a mobile device enrollment service 212 that is accessible through API endpoint 214. The functionality provided by these services will be described below in connection with the process flow charts of FIGS. 5-8.

Referring still to FIG. 2, database server 114 maintains a number of different databases accessible by API server 112, including: a mapping database 216 that stores a plurality of unique parameters and corresponding institution identifiers (e.g., institution/service portal tuples): a configuration database 218 that stores a plurality of institution identifiers (e.g., institution/service portal tuples) and corresponding configuration sets: a mobile credential eligibility database 220 that stores eligibility information; and a mobile device enrollment database 222 that stores mobile device information. In some embodiments, mobile device information may also be provided by a third party, as discussed below. Of course, one skilled in the art will appreciate that other types of data structures may be used within the scope of the present invention.

In this embodiment, API server 112 and database server 114 are co-located in the same geographic location. It should be understood, however, that these servers could be located in different geographic locations and connected to each other via communication network 170. It should also be understood that other embodiments may include a single server instead of API server 112 and database server 114. Further, other embodiments may include additional servers that are not shown in FIG. 1, e.g., one or more of the various services and associated databases could be provided on separate servers. Thus, the system may be implemented with any number and combination of servers, including API servers, database servers, web servers, and application servers, which are either co-located or geographically dispersed.

Referring back to FIG. 1, application store 120 comprises any digital distribution platform capable of storing and distributing micro-apps to mobile devices-including the micro-app of the present invention that is programmed to cause a mobile credential to be provisioned in the digital wallet of a mobile device. Examples of suitable application stores include the App Store R maintained by Apple Inc. of Cupertino, California (which stores and distributes App Clips™ software to mobile devices) and the Google Play™ store maintained by Google Inc. of Mountain View, California (which stores and distributes Instant Apps™ software to mobile devices). Of course, other application stores may be used within the scope of the present invention.

In this embodiment, application store 120 may also store a full mobile application that is associated with the micro-app. To access the full mobile application, a user must access application store 120 to locate the mobile application and then download and install the mobile application on the user's mobile device. The mobile application then prompts the user to select an institution, select a service portal, and enter login credentials (e.g., username and password). Once logged in, the user is presented with an interface that enables the user to perform a plurality of different tasks, such as deposit money into an account, view an account balance, pay for purchases, and/or add a mobile credential to a digital wallet.

Referring back to FIG. 1, institution systems $130_1$-$130_n$ are each operated and managed by a different institution. For example, institution system $130_1$ may be associated with Institution A and institution system $130_n$ may be associated with Institution B. Each of institution systems $130_1$-$130_n$ exposes an API endpoint that may be called by the micro-app loaded on a mobile device in order to authenticate the login credentials entered by a user during the login process, as described below. It should be understood that system 100 will include an institution system for each institution participating in the system. Thus, system 100 may include tens, hundreds or thousands of institution systems (or more) in accordance with the present invention.

Referring still to FIG. 1, digital wallet provider system 140 comprises any third party platform capable of supporting the provisioning of mobile credentials in the digital wallets of mobile devices. Examples of suitable digital wallet provider systems include the mobile credential provisioning system for Apple Wallet® maintained by Apple Inc. of Cupertino, California and the mobile credential provisioning system for Google Wallet® maintained by Google Inc. of Mountain View, California. Of course, other digital wallet provider systems may be used within the scope of the present invention.

Referring still to FIG. 1, mobile devices $150_1$-$150_n$ are used by users associated with institution system $130_1$ and, similarly, mobile devices $160_1$-$160_n$ are used by users associated with institution system $130_n$. In this embodiment, the users comprise individuals who have a need to launch the micro-app in order to provision mobile credentials associated with the institutions in the digital wallets of their mobile devices. Of course, it should be understood that additional mobile devices (not shown) may be used by users associated with additional participating institutions.

Each of mobile devices $150_1$-$150_n$ and $160_1$-$160_n$ comprises a computing device that includes memory in data communication with at least one processor, wherein the memory stores at least one computer program comprising instructions that, when executed by the processor, cause the processor to load and execute the micro-app, as described below in connection with the process flow charts of FIGS. 3 and 4. Preferably, each mobile device is also capable of downloading, installing and executing the full mobile application associated with the micro-app. Each mobile device also includes a digital wallet (i.e., a secure element for storing a mobile credential) and wallet software that enables the storage of a mobile credential in the digital wallet and the use of the stored mobile credential to conduct contactless transactions (e.g., wireless communication with near field communication devices). The digital wallet and wallet software for mobile devices $150_1$-$150_n$ and mobile devices $160_1$-$160_n$ are shown in FIG. 1 as wallets $152_1$-$152_n$ and wallets $162_1$-$162_n$, respectively. Examples of mobile devices that are suitable for use with the present invention include mobile phones (e.g., smart phones), wearable computing devices (e.g., smart watches), and personal computing tablets, which support the use of the micro-app (and preferably the full mobile application) and the storage and use of mobile credentials.

Communication network 170 may comprise any network or combination of networks capable of facilitating the exchange of data among the network elements of system 100. In some embodiments, communication network 170 enables communication in accordance with one or more cellular standards, such as the Long-Term Evolution (LTE) standard, the Universal Mobile Telecommunications System (UMTS) standard, and the like. In other embodiments, communication network 170 enables communication in accordance with the IEEE 802.3 protocol (e.g., Ethernet) and/or the IEEE 802.11 protocol (e.g., Wi-Fi). Of course, other types of networks may also be used within the scope of the present invention.

Mobile Credential Provisioning Methods

Referring to FIGS. 3-9, one embodiment of a method for provisioning mobile credentials in digital wallets of mobile devices in accordance with the present invention will now be described. The method includes the steps performed to provision a mobile credential in the digital wallet of a single mobile device. Of course, it should be understood that this provisioning process may be performed in connection with each of the mobile devices of system 100.

Figure 3:
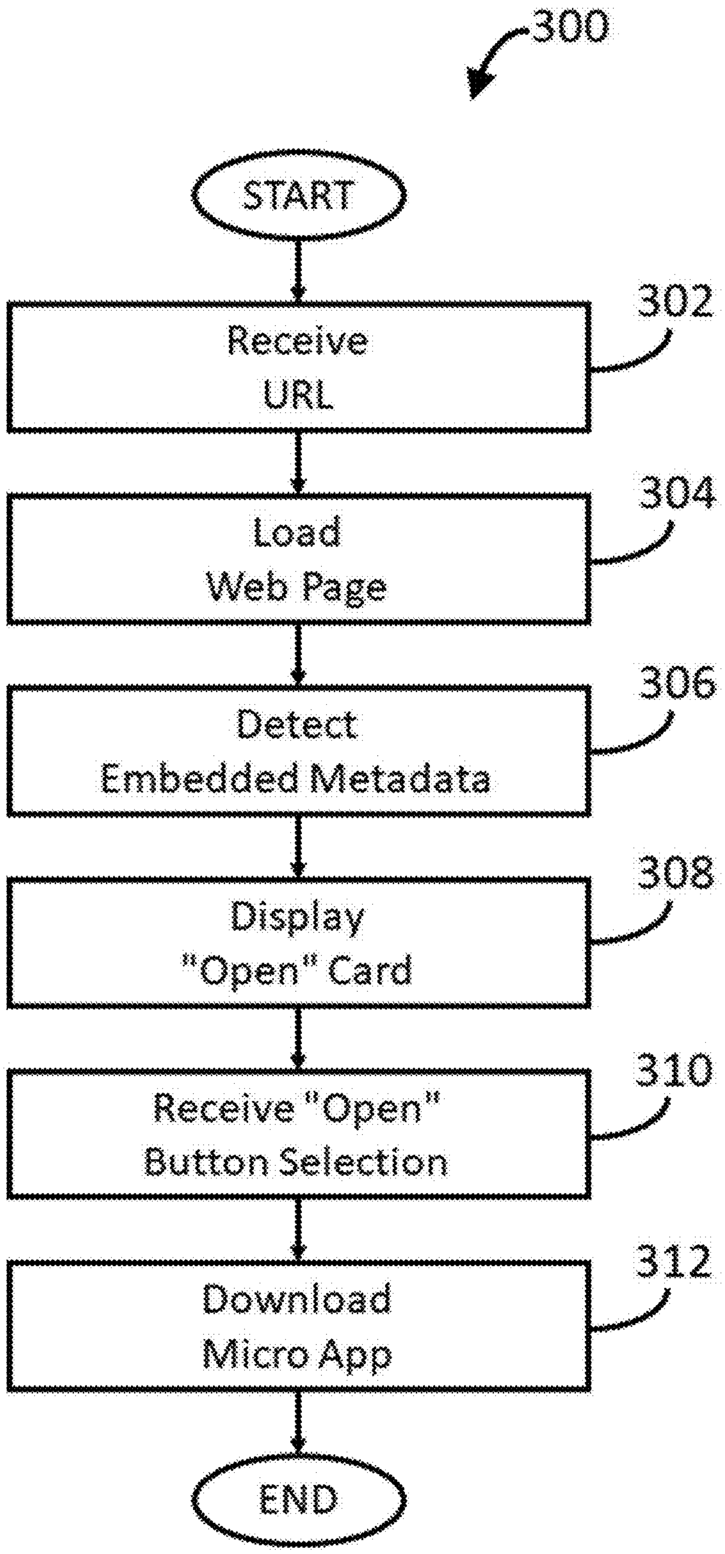
FIG. 3 is a process flow diagram of an exemplary method of invoking and loading a micro application for provisioning a mobile credential from the perspective of one of the mobile devices shown in FIG. 1.
Figure 4:
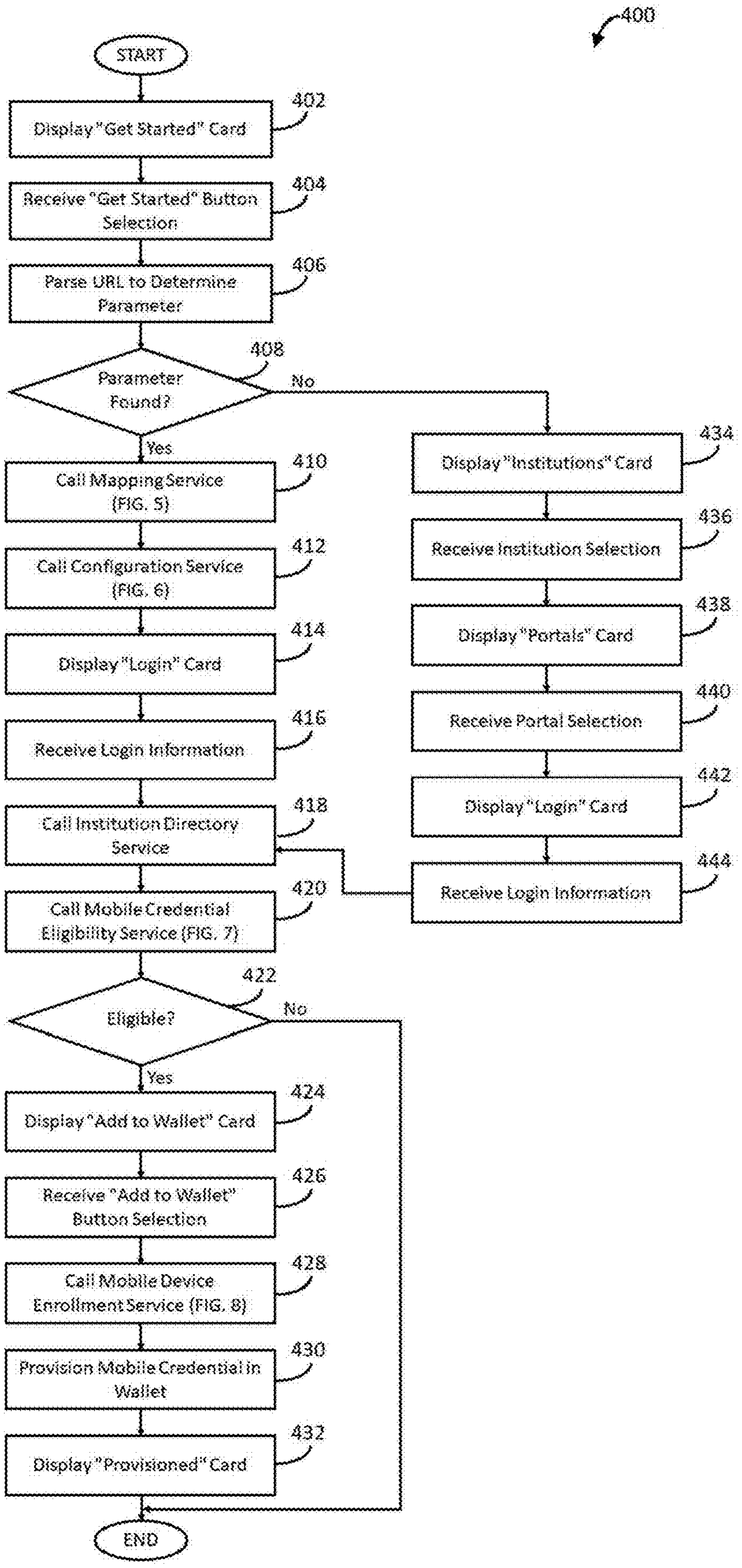
FIG. 4 is a process flow diagram of an exemplary method of executing the micro application loaded in FIG. 3 from the perspective of one of the mobile devices shown in FIG. 1.
Figure 5:
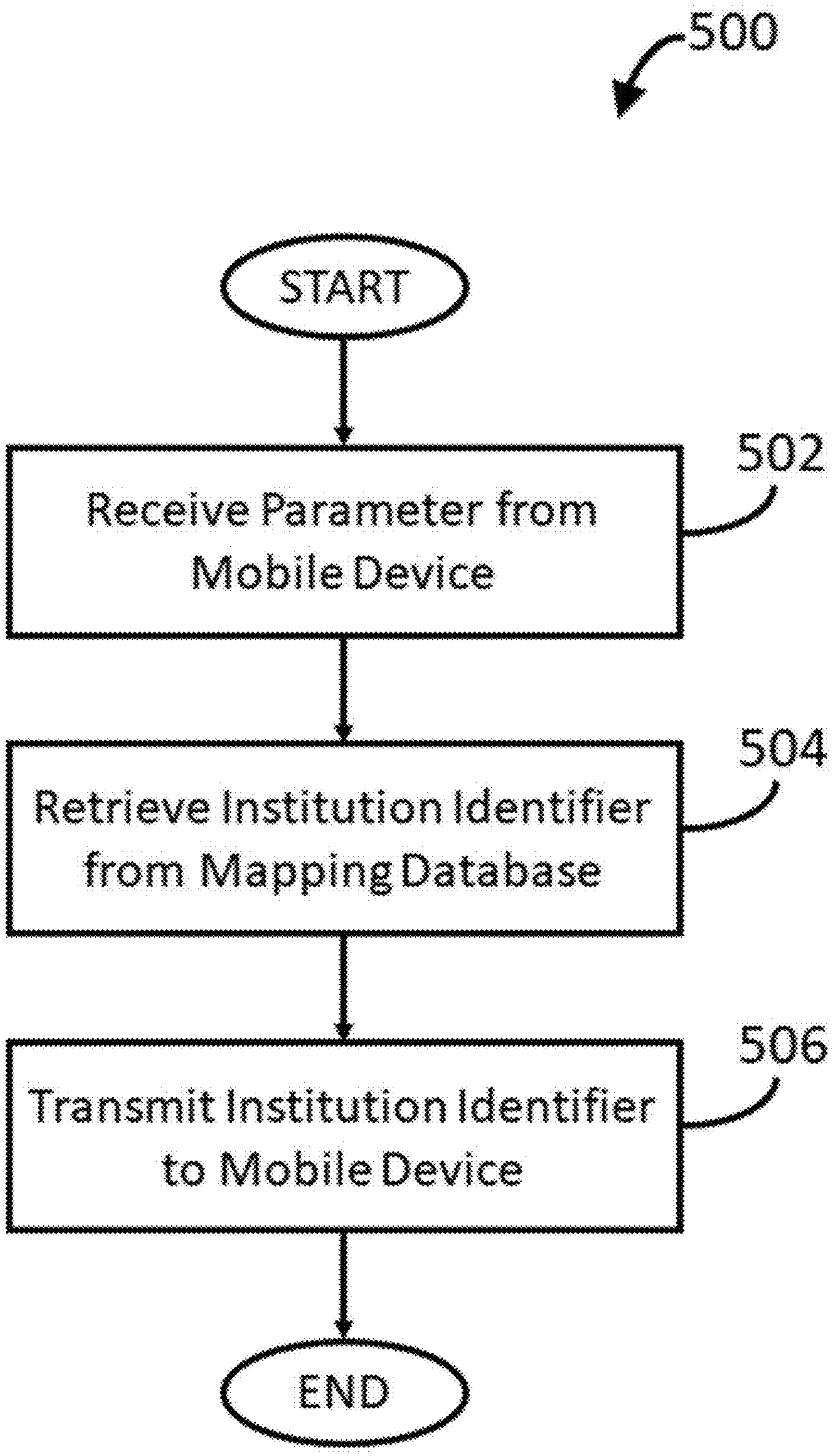
FIG. 5 is a process flow diagram of an exemplary mapping service from the perspective of the mobile credential management system shown in FIG. 2.
Figure 6:
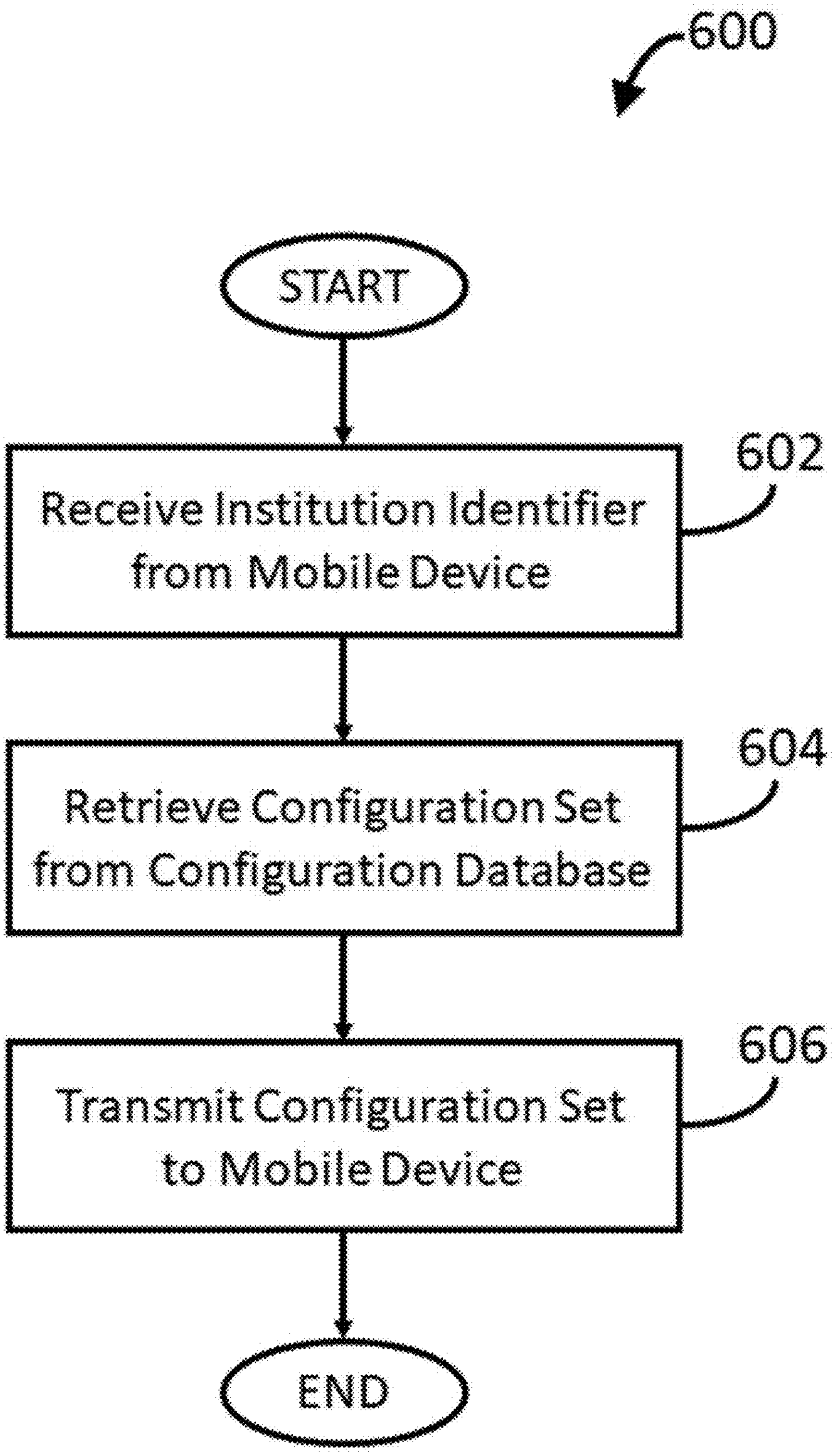
FIG. 6 is a process flow diagram of an exemplary configuration service from the perspective of the mobile credential management system shown in FIG. 2.
Figure 7:
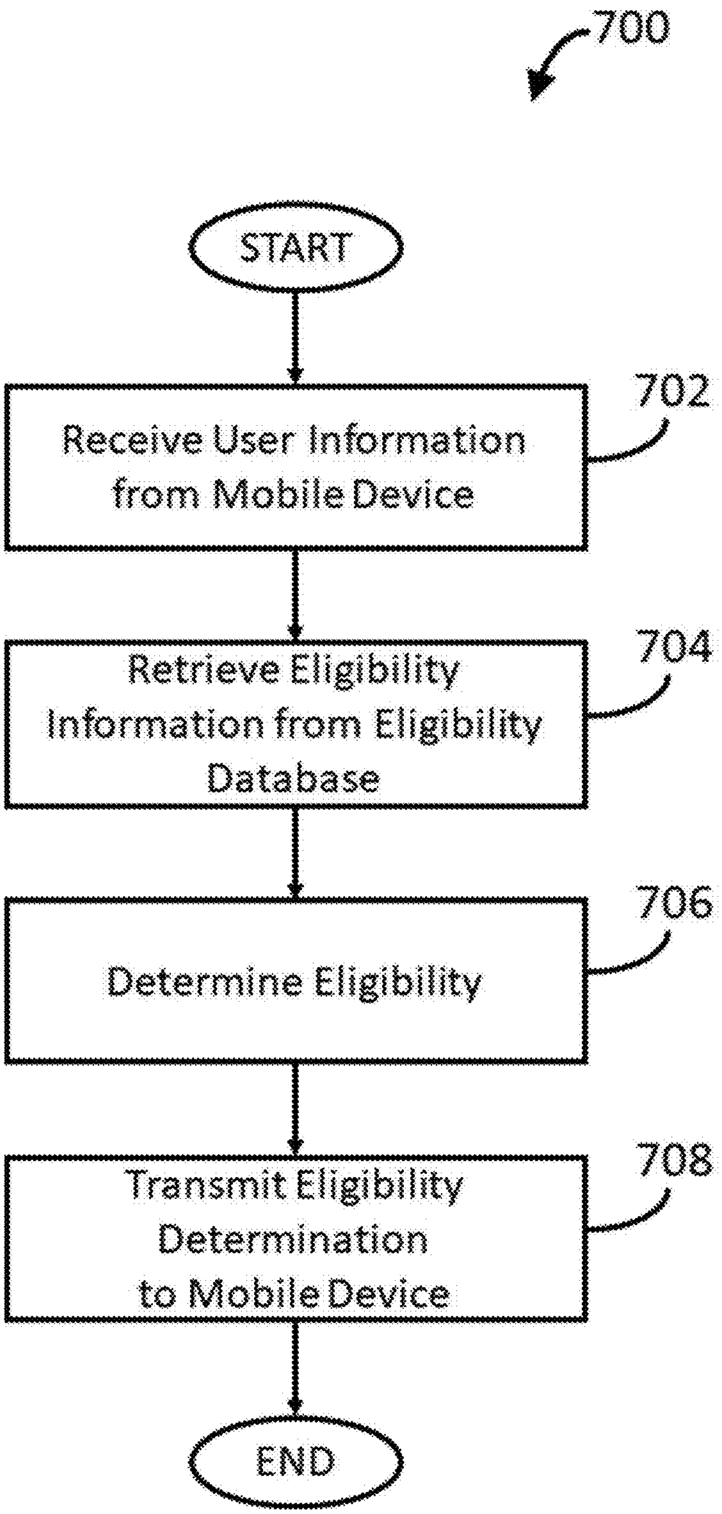
FIG. 7 is a process flow diagram of an exemplary mobile credential eligibility service from the perspective of the mobile credential management system shown in FIG. 2.
Figure 8:
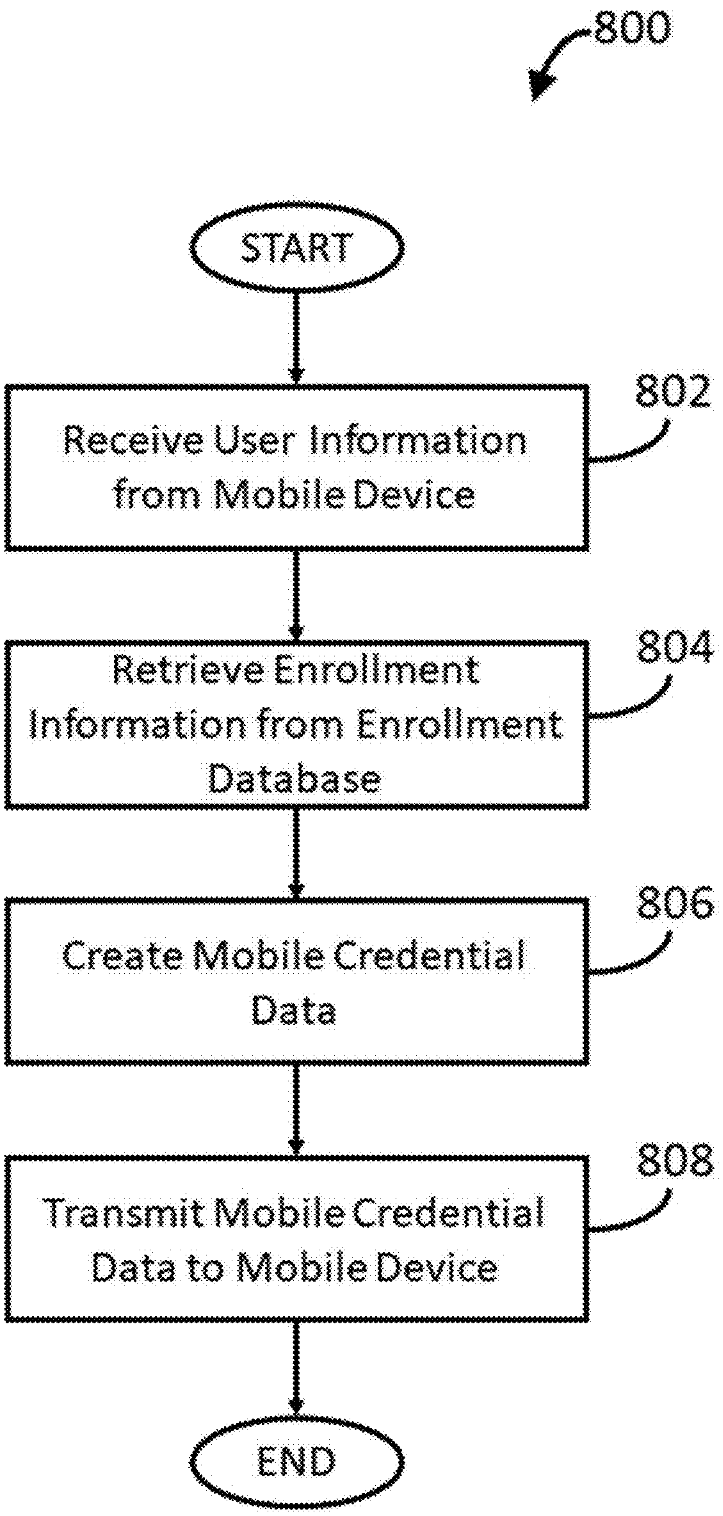
FIG. 8 is a process flow diagram of an exemplary mobile device enrollment service from the perspective of the mobile credential management system shown in FIG. 2.

As described in detail below, the method includes the steps performed by the mobile device to invoke and load a micro-app as shown in FIG. 3 and to execute the loaded micro-app as shown in FIG. 4. These steps will be described below from the perspective of the mobile device itself. During execution of the micro-app using the steps shown in FIG. 4, the mobile device will call various services provided on mobile credential management system 110, including a mapping service (FIG. 5), a configuration service (FIG. 6), a mobile credential eligibility service (FIG. 7), and a mobile device enrollment service (FIG. 8). These services will be described below from the perspective of mobile credential management system 110.

Referring to FIG. 3, an exemplary method of invoking loading a micro-app that is programmed to cause a mobile credential to be provisioned in the digital wallet of a mobile device in accordance with the present invention is shown generally as reference number 300.

In step 302, the mobile device receives an invocation URL associated with the micro-app. The invocation URL may be received in a number of different ways. First, a user may use his mobile device to scan a machine-readable code that encodes the invocation URL. For example, the machine-readable code may be displayed on signage, stickers, or other printed materials located at an institution or distributed by the institution to users. Second, a user may tap or place his mobile device near an NFC tag that stores the invocation URL. Third, a user may use his mobile device to access a website or installed mobile application and then select a link or button directed to the invocation URL that is provided on a user interface (e.g., a web page). For example, a user interface of an institution's website or mobile application may display the link or button, which gives the illusion that the provisioning process is supported by the institution (rather than mobile credential management system 110). The link or button may be added to the institution's website or mobile application without the need to provide a software development kit ("SDK") that can be costly and error prone—e.g., the link or button may require just one line of code to be added to the user interface. Of course, one skilled in the art will appreciate that the invocation URL may be provided in other ways, such as a link in an email or text message, a proprietary application, and other methods known in the art.

In this embodiment, the invocation URL includes two parts—a prefix and a unique parameter. The prefix comprises a scheme, host, and path (e.g., https://providername.com/ma), wherein "ma" is used to identify the URL as being associated with a micro-app. The unique parameter comprises a unique character string comprising eight alphanumeric characters (e.g., abcd1234). Thus, the invocation URL in this example would be "https://providername.com/ma/abcd1234." Of course, the prefix and unique parameter may have other formats, e.g., the number of characters in the unique character string may vary and the characters may comprise any combination of numbers, letters and/or symbols. Other types of unique codes known in the art may also be used.

The prefix portion of the invocation URL is registered with application store 120 as a launch URL for a micro-app and, as discussed below, may be used to distribute the appropriate micro-app to the mobile device. The unique parameter portion of the invocation URL is used to identify a particular institution and optionally a particular service portal of that institution and, as discussed below, may be used to determine a configuration set for the institution. The inclusion of the unique parameter in the invocation URL enables the micro-app to be used by users associated with a plurality of different institutions. If the micro-app is only used to provision mobile credentials for a single institution, the unique parameter portion of the invocation URL may not be required.

In step 304, the mobile device uses the invocation URL to load a web page hosted by a web server (not shown in FIG. 1). In this embodiment, the web server is provided by the same party who provides mobile credential management system 110. Specifically, the mobile device directs a request to the web server identified by the invocation URL, and the web server generates and returns a web page to the mobile device. The web page includes meta data in the HTML code that identifies the micro-app to be loaded. For example, the web page may include a meta tag that includes a parameter called "micro-app-bundle-id" with a value of "com.providername.accounts.microapp." Thus, the following code would appear in the meta tag of the web page: micro-app-bundle-id=com.providername.accounts.microapp. In step 306, when the web page is loaded, the mobile device detects the value associated with the "micro-app-bundle-id" parameter in the HTML code.

Figure 9:
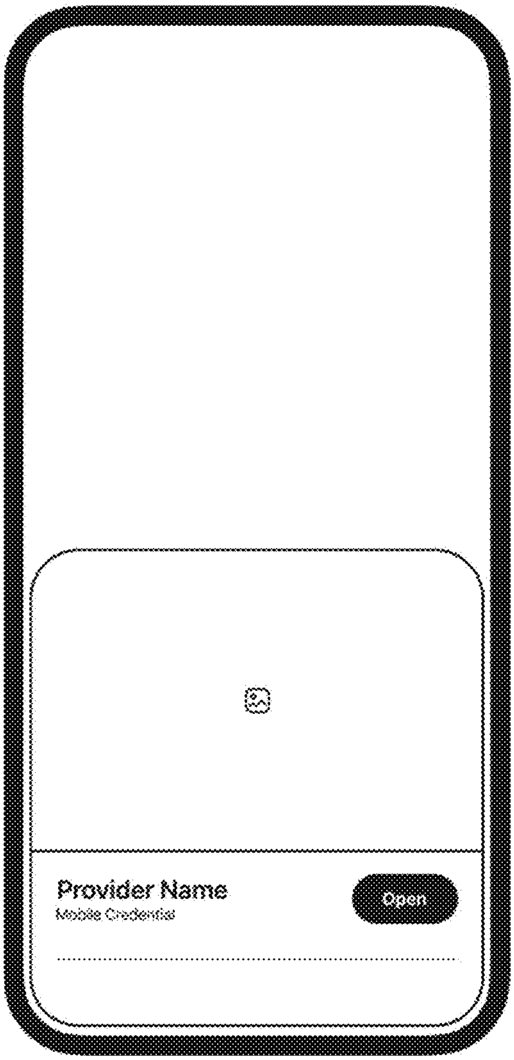
FIGS. 9-10 depict exemplary screen shots of one of the mobile devices shown in FIG. 1 during invocation and loading of the micro application in accordance with the method shown in FIG. 3.
Figure 10:
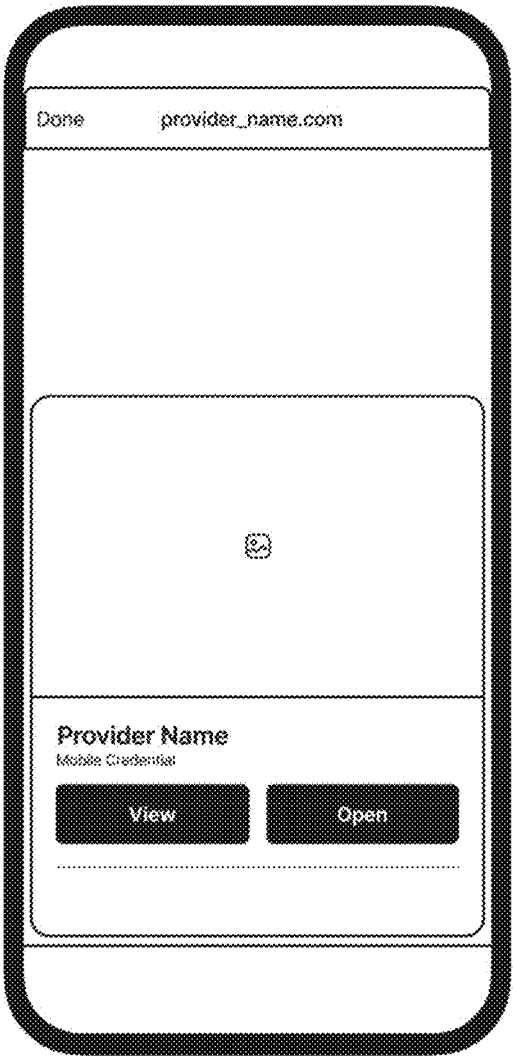

In step 308, the mobile device displays a user interface that prompts the user to open the micro-app. The configuration of the user interface may depend on the manner in which the invocation URL was received by the mobile device in step 302. For example, in cases where the mobile device has been used to scan a machine-readable code or read an NFC tag, the user interface may comprise a card that is displayed on top of the current open application on the mobile device. An example of such a card is shown in FIG. 9, which includes an "Open" button inviting the user to open the micro-app. However, in cases where the mobile device has been used to access a website or installed mobile application that enables a user to select a link or button on a user interface, such as a web page, the user interface may comprise a card that is displayed over the web page. An example of such a card is shown in FIG. 10, which includes a "View" button inviting the user to open a web page in a web browser (which dismisses the micro-app request) and an "Open" button inviting the user to open the micro-app. In step 310, the user selects the "Open" button on the applicable card of FIGS. 9 and 10. It should be understood that steps 302-310 are managed natively by the operating system of the mobile device.

In step 312, upon selection of the "Open" button, the mobile device transmits the invocation URL that was received in step 302 and the value associated with the "micro-app-bundle-id" parameter that was detected in step 306 to application store 120. Application store 120 uses this information to locate and return the appropriate micro-app to the mobile device, as well as pass in the invocation URL. The mobile device then loads the micro-app into device memory and executes the micro-app.

Referring to FIG. 4, an exemplary method of executing a micro-app that is programmed to cause a mobile credential to be provisioned in the digital wallet of a mobile device in accordance with the present invention is shown generally as reference number 400.

Figure 11:
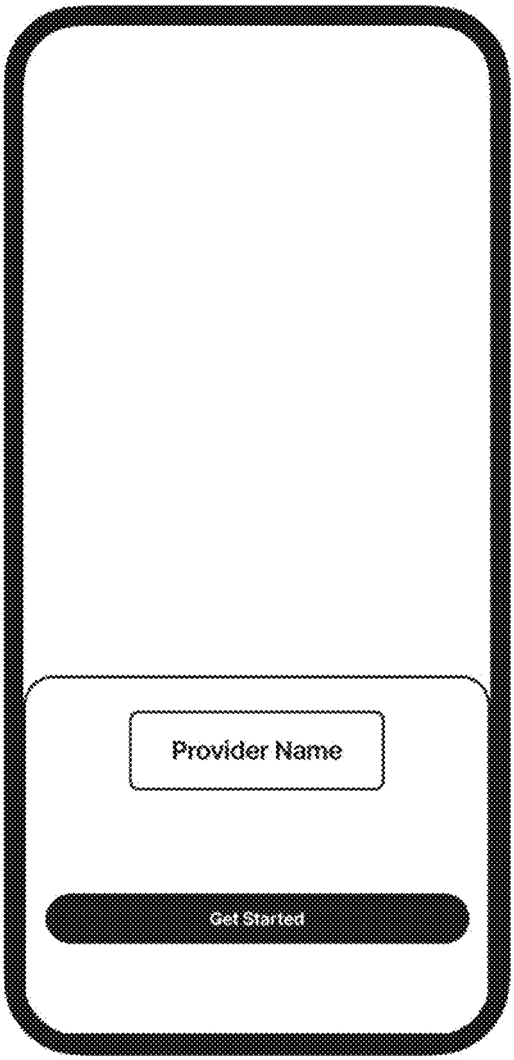
FIGS. 11-21 depict exemplary screen shots of one of the mobile devices shown in FIG. 1 during execution of the micro application in accordance with the method shown in FIG. 4.

In step 402, upon execution of the micro-app, the mobile device displays a user interface that prompts the user to start the provisioning process. An example of such a user interface is the card shown in FIG. 11, which includes a "Get Started" button inviting the user to start the provisioning process. In step 404, the user selects the "Get Started" button shown in FIG. 11.

In step 406, upon selection of the "Get Started" button, the invocation URL that was passed from application store 120 to the mobile device is parsed by the micro-app to determine the unique parameter e.g., the unique code with eight alphanumeric characters (e.g., abcd1234). In step 408, the micro-app determines whether the invocation URL is complete and the unique parameter is found. If so, the process proceeds to step 410 to begin a streamlined provisioning path. If not, the process proceeds to step 434 to begin a fallback provisioning path, described below, which requires the user to select an institution from an institutions list and a service portal from a service portals list (rather than have the institution and service portal automatically determined by the micro-app).

In step 410, the micro-app uses an API to pass the unique parameter that was parsed in step 406 to API endpoint 202 of mapping service 200 shown in FIG. 2. The steps performed by mapping service 200 are shown generally as reference number 500 in FIG. 5. In step 502, mapping service 200 receives the unique parameter from the mobile device and, in step 504, accesses mapping database 216 to retrieve an institution identifier corresponding to the unique parameter. In this embodiment, the institution identifier comprises an institution/service portal tuple, i.e., a tuple with a first numeric value that identifies the institution and a second numeric value that identifies the service portal. Of course, in other embodiments, the institution identifier may only include a numeric value that identifies the institution (i.e., in cases where there is no service portal) or may include any other information required by a particular institution. In step 506, mapping service 200 transmits the institution identifier back to the micro-app via API endpoint 202.

Referring back to FIG. 4, in step 412, the micro-app uses an API to pass the institution identifier to API endpoint 206 of configuration service 204 shown in FIG. 2. The steps performed by configuration service 204 are shown generally as reference number 600 in FIG. 6. In step 602, configuration service 204 receives the institution identifier from the mobile device and, in step 604, accesses configuration database 218 to retrieve the configuration set corresponding to the institution identifier. The configuration set may include different types of information associated with an institution.

In one aspect, the configuration set identifies information on an identity service provider responsible for authenticating users associated with the institution during the login process. For example, the configuration set may include an ID of the identity service provider and/or a URL of the identity service provider to enable transmission of authentication requests to the identity service provider, as described below. In this embodiment, it will be seen that the identity service provider is an institution directory service operated by the institution.

In another aspect, the configuration set identifies customized content for the institution. For example, the configuration set may include an ID of the institution that can be used to retrieve customized content from another database—wherein the customized content may be retrieved either by configuration service 204 and passed back to the micro-app or by the micro-app itself. Alternatively, all or a portion of the customized content may be provided as part of the configuration set. The customized content may include, for example, the name and/or logo of the institution (wherein the name and/or logo are preferably provided using the font and color(s) provided in the branding guidelines for the institution) and/or textual information to be used in generating one or more user interfaces, such as a login card, which is preferably configurable by the institution. Of course, the configuration set may include other types of information in accordance with the present invention.

In step 606, configuration service 204 transmits the configuration set for the institution (including any customized content retrieved from another database) back to the micro-app via API endpoint 206.

Figure 12:
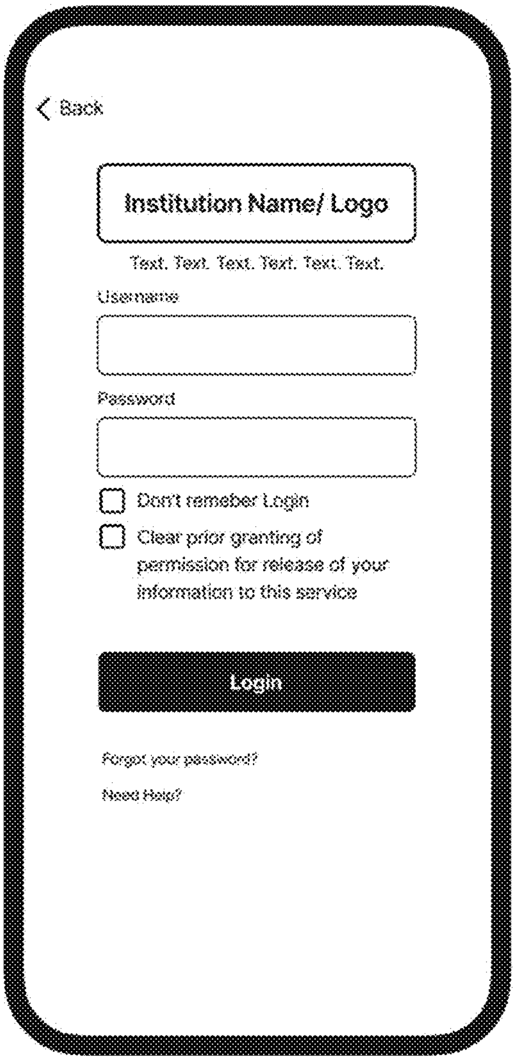

Referring back to FIG. 4, in step 414, the mobile device displays a user interface that prompts the user to enter login credentials. In this embodiment, the micro-app generates the user interface based on a predetermined format that is used for all of the participating institutions. The predetermined format may include, for example, data entry fields for entering login credentials, such as a username and password. The predetermined format also allows for the dynamic inclusion of all or a portion of the customized content received in step 412—e.g., the name and/or logo of the institution (wherein the name and/or logo are preferably provided using the font and color(s) provided in the branding guidelines for the institution) and/or textual information. Of course, other types of customized content may also be included within the scope of the present invention. An example of such a user interface is the login card shown in FIG. 12, which includes a placeholder for the institution's name and logo, a placeholder for the textual information, and data entry fields for the username and password. In step 416, the user enters his login credentials and selects the "Login" button shown in FIG. 12.

In step 418, the micro-app uses an API to pass the login credentials to an API endpoint of an institution directory service provided by the institution—i.e., the institution directory service functions as an identity service provider in this embodiment. Specifically, the micro-app uses information included in the configuration set received in step 412—e.g., the ID and URL of the identity service provider—to transmit an authentication request (e.g., a standard SAML2 authentication request) to the institution directory service of the applicable institution (e.g., one of institution systems $130_1$-$130_n$). The institution directory service uses the login credentials to authenticate the user, which may involve any level of authentication required by the institution (e.g., verification of identity and multi-factor authentication). The institution directory service then returns to the mobile device an indication of whether the user was authenticated along with a token comprising user information associated with the login credentials. The user information may comprise, for example, an email address, a customer number, or any other information that identifies the user. The user information is then mapped to a user record that provides additional user information, such as the user's name, one or more identifiers (e.g., an ID card number, a student ID number, or both), and any other information required by the institution. Of course, in other embodiments, the identity service provider may be a separate entity that provides authentication services on behalf of the institution.

In step 420, the micro-app uses an API to pass the user information received in step 418 to API endpoint 210 of mobile credential eligibility service 208 shown in FIG. 2. The steps performed by mobile credential eligibility service 208 are shown generally as reference number 700 in FIG. 7. In step 702, mobile credential eligibility service 208 receives the user information from the mobile device and, in step 704, accesses mobile credential eligibility database 220 to retrieve eligibility information. The eligibility information may comprise, for examiner, information regarding the institution associated with the user and information regarding the mobile device used by the user. In some cases, at least a portion of the mobile device information may also be retrieved from a third party. For example, the original equipment manufacturer (OEM) vendor of the mobile device may provide information on whether the mobile device supports the storage and use of mobile credentials. In step 706, mobile credential eligibility service 208 determines whether the user is eligible to provision a mobile credential in the digital wallet of his mobile device. In this embodiment, the eligibility determination is made based on a number of different factors, such as (1) whether the user's name and ID card number contained in the user information received in step 702 are valid, (2) whether the institution information retrieved in step 704 indicates that the institution permits use of the micro-app to provision the mobile credential, and (3) whether the mobile device information retrieved in step 704 indicates that the mobile device supports the storage and use of mobile credentials. Of course, one skilled in the art will appreciate that other factors may be used to determine eligibility in other embodiments. It should be understood that mobile credential eligibility service 208 may communicate with digital wallet provider system 140 to make the eligibility determination. In step 708, mobile credential eligibility service 208 transmits the eligibility determination back to the micro-app via API endpoint 210.

In step 422, the micro-app determines whether the user is eligible to provision a mobile credential in the digital wallet of his mobile device based on the information received in step 420. If eligible, the process proceeds to step 424 to continue the streamlined provisioning path. However, if either the user or the user and mobile device combination is not eligible to provision a mobile credential, the process ends.

Figure 13:
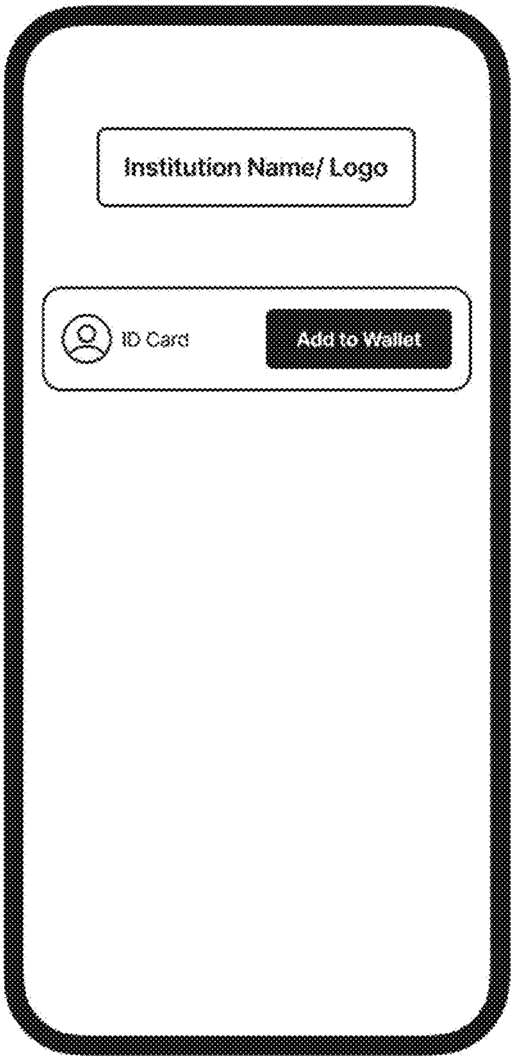

In step 424, the mobile device displays a user interface that prompts the user to begin the process of adding the mobile credential to a digital wallet of the mobile device (wherein the wallet may be one of several digital wallets on the mobile device in some cases). An example of such a user interface is the card shown in FIG. 13, which includes an "Add to Wallet" button inviting the user to begin the process of adding the mobile credential (the user's ID card number in this embodiment) to a digital wallet of the mobile device. In step 426, the user selects the "Add to Wallet" button shown in FIG. 13. Of course, in other embodiments, the user may be allowed to add the mobile credential to multiple digital wallets in which case an "Add to Wallet" button would be provided for each supported wallet type.

In step 428, the micro-app uses an API to pass the user information identified in step 418 to API endpoint 214 of mobile device enrollment service 212 shown in FIG. 2. The steps performed by mobile device enrollment service 212 are shown generally as reference number 800 in FIG. 8. In step 802, mobile device enrollment service 212 receives the user information from the mobile device and, in step 804, accesses mobile device enrollment database 222 to retrieve information regarding the mobile device used by the user. In some cases, at least a portion of the mobile device information may also be retrieved from a third party, such as the OEM vendor of the mobile device. In step 806, mobile device enrollment service 212 creates a secure bundle of information needed to provision the mobile credential in the digital wallet of the mobile device—wherein that information is referred to herein as "mobile credential data." It should be understood that mobile device enrollment service 212 may communicate with digital wallet provider system 140 to create the mobile credential data. In step 808, mobile device enrollment service 212 transmits the mobile credential data back to the micro-app via API endpoint 214.

In this embodiment, the mobile credential data includes one or more identifiers (e.g., an ID card number, a student ID number, or both), as well as information on the mobile device (e.g., device ID, digital wallet ID, secure element ID, etc.), all of which are preferably encrypted. It should be understood that the one or more identifiers contained in the mobile credential data (which will ultimately be included in the mobile credential that is provisioned in the digital wallet of the mobile device) will vary between different institutions. Each institution will provide readers that are configured to read the appropriate identifier(s) once provisioned. Also, the mobile device information contained in the mobile credential data will vary between different OEM vendors of mobile devices. Other types of information may also be included in the mobile credential data in accordance with the present invention. For example, if the institution comprises a university, the mobile credential data may include the suicide hotline number and other legally required numbers, as well as information that will be used by the digital wallet to display the card with the appropriate logo, colors, user photo, and user name.

Figure 14:
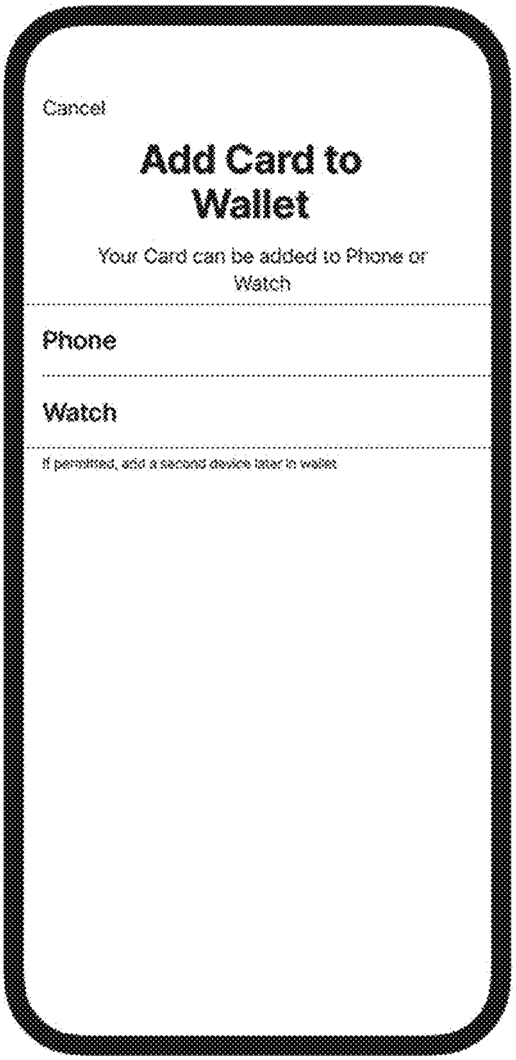

In step 430, the micro-app transmits the mobile credential data received in step 808 to the wallet software on the mobile device. At this point, the micro-app transfers control to the wallet software, which guides the process of provisioning the mobile credential in the digital wallet of the mobile device. In this embodiment, the mobile device displays a user interface that prompts the user to select the mobile device to which the mobile credential should be added. An example of such a user interface is the card shown in FIG. 14, which invites the user to select either a phone or a watch. This description will assume that the user selects the phone, but the watch could alternatively be selected by the user—i.e., the process is the same regardless of whether the phone or watch is selected.

Figure 15:
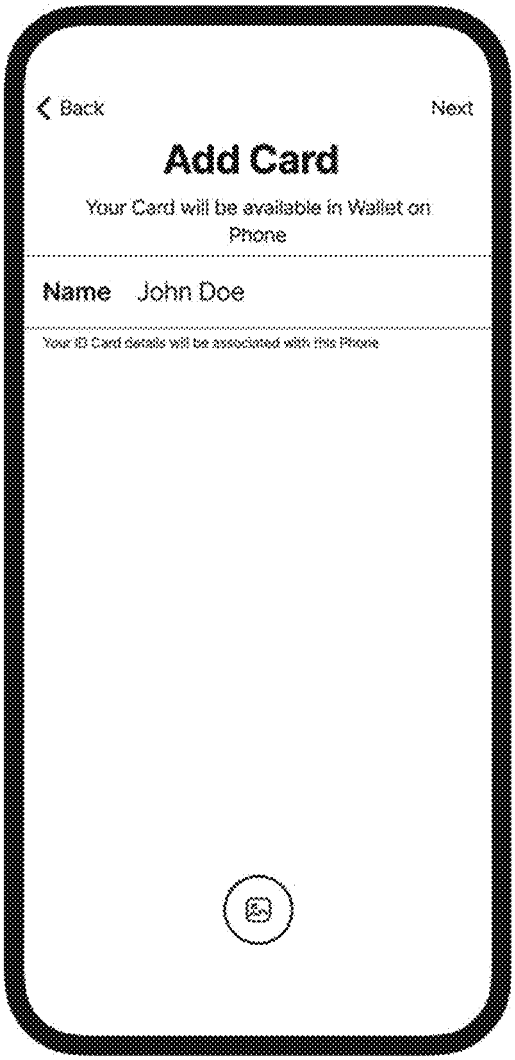
Figure 16:
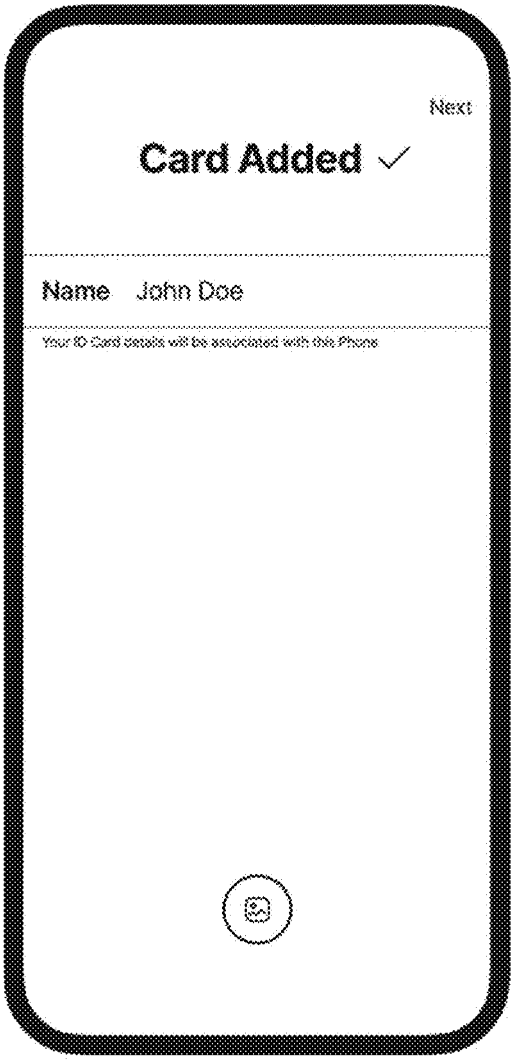
Figure 17:
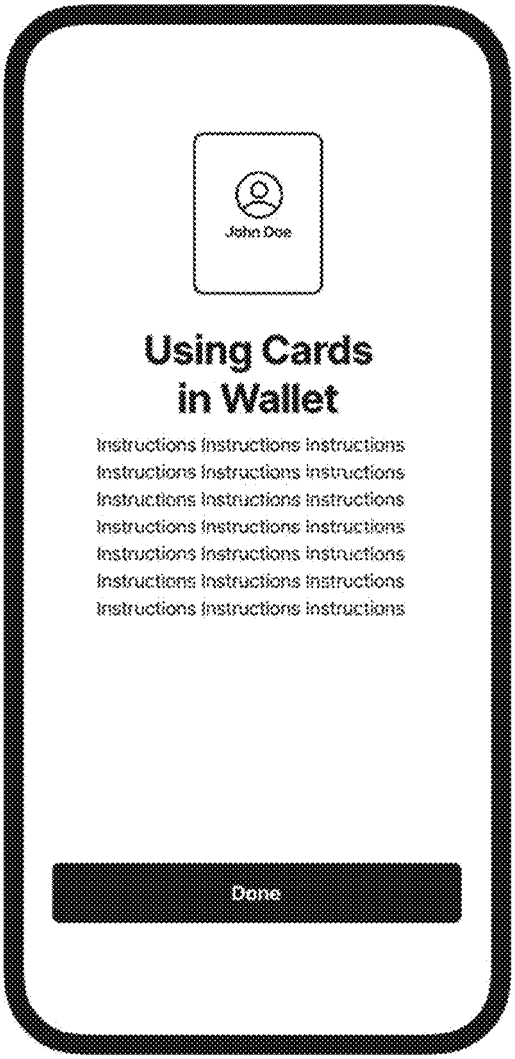

Once the phone is selected, the mobile device may display one or more additional user interfaces during the process of provisioning the mobile credential (e.g., ID card), depending on the requirements of the wallet software. Examples of such user interfaces include: a card confirming that the ID card will be added to the phone (FIG. 15): a card providing the terms and conditions of use (wherein the user must select a button to agree to those terms and conditions): a card confirming that the ID card has been added to the phone (FIG. 16); and a card providing instructions on how the provisioned ID card may be used along with a "Done" button inviting the user to finish the process of adding the ID card to the phone (FIG. 17). When the user selects the "Done" button shown in FIG. 17, control is transferred from the wallet software back to the micro-app loaded on the mobile phone.

Figure 18:

In step 432, the mobile device displays a user interface indicating that the mobile credential has been provisioned in the digital wallet of the mobile device. An example of such a user interface is the card shown in FIG. 18, which shows that the ID card has been provisioned in the digital wallet of the phone. In this embodiment, the user may be permitted to add a mobile credential to the digital wallet of another mobile device (e.g., the user may want to add the ID card to a phone and a watch, to two different phones, etc.). For example, in FIG. 18, the card includes an "Add to Wallet" button that may be selected to add the ID card to the user's watch (in addition to the phone that has already been provisioned). One skilled in the art will appreciate that the provisioning process is then repeated for the additional mobile device.

As noted above, there are instances in which the streamlined provisioning path of steps 402 to 432 may not be available, such as when the invocation URL is not complete and the unique parameter is not found (as determined in step 408). In those instances, the micro-app provides a fallback provisioning path in steps 434 to 444.

Figure 19:
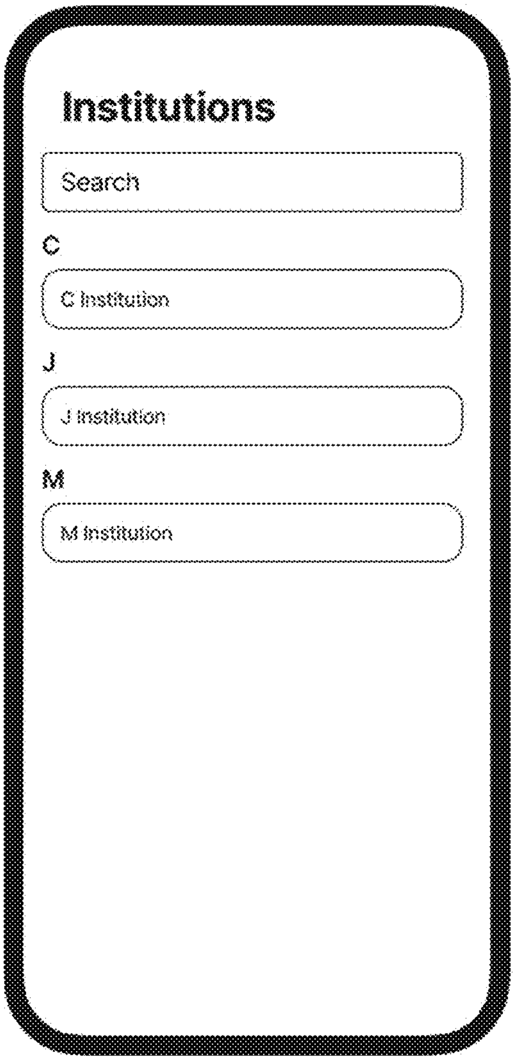

In step 434, the mobile device displays a user interface that lists the institutions that can be selected by the user. Preferably, the list only contains the names of institutions that support use of the micro-app to provision mobile credentials in the digital wallets of mobile devices (and not the names of institutions that support the full mobile application, but not the micro-app). An example of such a user interface is the card shown in FIG. 19, which enables easy selection of an institution through a search tool or alphabetical lists of institution names. In step 436, the user selects one of the institutions listed in FIG. 19.

Figure 20:
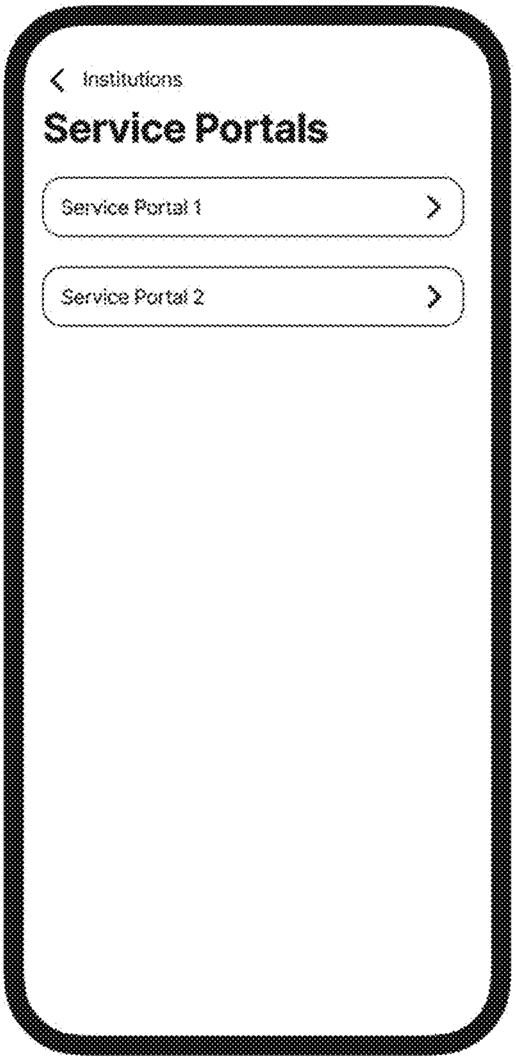

In step 438, the mobile device displays a user interface that lists the service portals associated with the selected institution. For example, if the institution is a university, the service portals may comprise students and employees (faculty, staff, etc.). Some institutions may only have a single service portal, in which case only one service portal will be displayed for selection by the user. An example of such a user interface is the card shown in FIG. 20, which enables a user to select between "Service Portal 1" and "Service Portal 2." In step 440, the user selects one of the service portals listed in FIG. 20.

Figure 21:
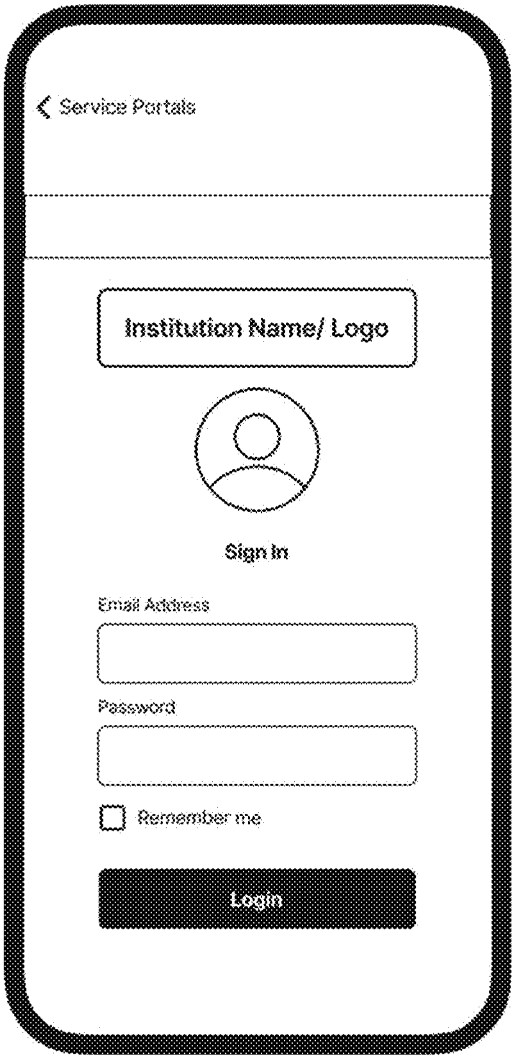

In step 442, the mobile device displays a user interface that prompts the user to enter login credentials. An example of such a user interface is the login card shown in FIG. 21, which includes data entry fields for email address and password. In step 444, the user enters his login credentials and selects the "Login" button shown in FIG. 21.

Upon receipt of the login credentials, the process proceeds to step 418 in order to complete the provisioning process. Thus, it can be appreciated that steps 418 to 432 described above are common to both the streamlined processing path and the fallback processing path.

In this embodiment, once the ID card has been provisioned in the digital wallet of a mobile device, the user can utilize the mobile device for access control (e.g., unlocking doors), payments from a stored value account (e.g., pre-paid meal plans or other prepaid goods and services), and/or any other tasks that require the use of an ID card. Preferably, the ID card is available for use even when the mobile device needs to be recharged. Also, the system preferably provides an option to remove the ID card from the digital wallet of the mobile device when no longer needed.

One skilled in the art will appreciate that the system and method described above may be simplified in cases where a micro-app is associated with a specific institution (and optional service portal) rather than being designed for use by multiple institutions. For example, if a micro-app is only used by one institution, certain functions supported by the mobile credential management system 110 could be hard-coded in the micro-app in order to simplify the provisioning process—i.e., the functions may either be hard-coded in the micro-app or provided to the micro-app via configuration in accordance with the invention.

One skilled in the art will also appreciate that the invention may be used by any institution in which users have a need to provision mobile credentials in mobile wallets of mobile devices. For example, the institution may comprise a university in which students and employees can use their provisioned mobile devices to unlock doors of campus buildings, purchase food on pre-paid meal plans or from vending machines, access laundry services, or perform any other tasks that require the use of a campus ID card. As another example, the institution may comprise a hotel in which hotel guests can use their provisioned mobile phones to unlock doors at the hotel or purchase snacks, movies, etc. As another example, the institution may comprise a hospital or any other business in which users can use their provisioned mobile phones to navigate through secure access points. As another example, the institution may comprise the provider of a mobile application that enables users to rent or lease houses, rooms, vehicles, or other access-controlled spaces, wherein users can use their provisioned mobile phones as digital keys to access such spaces. As another example, the institution may comprise a theme park in which users can use their provisioned mobile phones as digital keys to access rides/features while avoiding long lines. As yet another example, the institution may comprise an entity that provides security-related services at airports (e.g., TSA Pre-Check®, NEXUS, CLEAR, etc.), wherein users can use their provisioned mobile phones to expedite screening at airport security lines. Of course, other implementations will be apparent to one skilled in the art.

The systems and methods described herein provide many advantages compared to existing electronic account management systems, including: (i) for a micro-app used by different institutions, a mobile credential may be provisioned for a specific institution and service portal without the need to select the institution and service portal-which is possible due to the inclusion of the unique parameter in the invocation URL; (ii) a mobile credential may be quickly provisioned without needing to install a full mobile application—which is possible due to the use of the micro-app: (iii) a link or button may be added to a third party website or mobile application without the need to provide a software development kit ("SDK") that can be costly and error prone—e.g., the link or button may require just one line of code to be added to a user interface, such as a web page—which gives the illusion that the provisioning process is provided by the third party; and (iv) the invention may drive adoption by pervasive placing of launch codes or NFC tags at an institution.

General Information

The description set forth above provides several exemplary embodiments of the inventive subject matter. Although each exemplary embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

The use of any and all examples or exemplary language (e.g., "such as" or "for example") provided with respect to certain embodiments is intended merely to better describe the invention and does not pose a limitation on the scope of the invention. No language in the description should be construed as indicating any non-claimed element essential to the practice of the invention.

The use of the terms "comprises," "comprising," or any other variation thereof, are intended to cover a non-exclusive inclusion, such that a system or method that comprises a list of elements does not include only those elements, but may include other elements not expressly listed or inherent to such system or method.

The use of relative relational terms, such as first and second, are used solely to distinguish one unit or action from another unit or action without necessarily requiring or implying any actual such relationship or order between such units or actions.

Finally, while the present invention has been described and illustrated hereinabove with reference to various exemplary embodiments, it should be understood that various modifications could be made to these embodiments without departing from the scope of the invention. Therefore, the present invention is not to be limited to the specific systems or methodologies of the exemplary embodiments, except insofar as such limitations are included in the following claims.

What is claimed and desired to be secured by Letters Patent is as follows:

1. A non-transitory computer readable medium storing instructions that, when executed by one or more processors of a computing device, cause the one or more processors to perform a plurality of operations comprising: launching a micro application, wherein an operating system of the computing device manages a lifecycle of the micro application and unloads the micro application without user action; identifying a unique parameter associated with an institution; identifying, based on the unique parameter at launch time, a configuration set corresponding to the institution, wherein the configuration set controls generation of a user interface by identifying customized content for the institution; causing the micro application to display the user interface that includes the customized content for the institution and one or more data input fields for entry of login credentials by a user, wherein the login credentials entered into the data input fields enable authentication of the user; identifying one or more identifiers associated with the user; and creating mobile credential data that includes the one or more identifiers, wherein the mobile credential data enables provisioning of a mobile credential in a digital wallet of the computing device.

2. The non-transitory computer readable medium of claim 1, wherein the computing device comprises one of a mobile phone, a wearable computing device, or a personal computing tablet.

3. The non-transitory computer readable medium of claim 1, wherein the unique parameter associated with the institution comprises a portion of an invocation Uniform Resource Locator (URL).

4. The non-transitory computer readable medium of claim 3, wherein the mobile device is configured to decode the invocation URL from a machine-readable code to thereby launch the micro application.

5. The non-transitory computer readable medium of claim 3, wherein the mobile device is configured to read the invocation URL from a Near-Field Communication (NFC) tag to thereby launch the micro application.

6. The non-transitory computer readable medium of claim 3, wherein the mobile device is configured to render an interface that presents a link or button directed to the invocation URL, wherein selection of the link or button causes launch of the micro application.

7. The non-transitory computer readable medium of claim 1, wherein the operations further comprise: generating the user interface based on a predetermined format configured for use with a plurality of different institutions, wherein the predetermined format includes the data input fields and enables dynamic inclusion of the customized content for the institution.

8. The non-transitory computer readable medium of claim 1, wherein the customized content comprises one or more of a name of the institution, a logo associated with the institution, and a color associated with the institution.

9. The non-transitory computer readable medium of claim 1, wherein the customized content comprises textual information configured for the institution.

10. The non-transitory computer readable medium of claim 1, wherein identifying the configuration set corresponding to the unique parameter comprises: transmitting the unique parameter to a mapping service in communication with a mapping database, wherein the mapping database stores a plurality of unique parameters and corresponding configuration sets, and wherein the mapping service (a) accesses the mapping database to identify the configuration set corresponding to the unique parameter and (b) transmits the configuration set to the computing device.

11. The non-transitory computer readable medium of claim 1, wherein identifying the configuration set corresponding to the unique parameter comprises: transmitting the unique parameter to a mapping service in communication with a mapping database, wherein the mapping database stores a plurality of unique parameters and corresponding institution identifiers, and wherein the mapping service (a) accesses the mapping database to identify an institution identifier corresponding to the unique parameter and (b) transmits the institution identifier to the computing device; and transmitting the institution identifier to a configuration service in communication with a configuration database, wherein the configuration database stores a plurality of institution identifiers and corresponding configuration sets, and wherein the configuration service (a) accesses the configuration database to identify the configuration set corresponding to the institution identifier and (b) transmits the configuration set to the computing device.

12. The non-transitory computer readable medium of claim 11, wherein the institution identifier comprises an institution and service portal tuple.

13. The non-transitory computer readable medium of claim 1, wherein identifying the one or more identifiers associated with the user comprises: receiving user information associated with the login credentials from an identity service provider; and identifying the one or more identifiers corresponding to the user information.

14. The non-transitory computer readable medium of claim 13, wherein the configuration set identifies the identity service provider.

15. A non-transitory computer readable medium storing instructions that, when executed by one or more processors of a computing device, cause the one or more processors to perform a plurality of operations comprising: launching a micro application, wherein an operating system of the computing device manages a lifecycle of the micro application and unloads the micro application without user action; identifying a unique parameter associated with an institution; identifying, based on the unique parameter at launch time, a configuration set corresponding to the institution, wherein the configuration set controls generation of a user interface by identifying an identity service provider for the institution; causing the micro application to display the user interface that includes one or more data input fields for entry of login credentials by a user, wherein the login credentials entered into the data input fields enable authentication of the user by the identity service provider for the institution; receiving user information associated with the login credentials from the identity service provider for the institution; identifying one or more identifiers corresponding to the user information; and creating mobile credential data that includes the one or more identifiers, wherein the mobile credential data enables provisioning of a mobile credential in a digital wallet of the computing device.

16. The non-transitory computer readable medium of claim 15, wherein the computing device comprises one of a mobile phone, a wearable computing device, or a personal computing tablet.

17. The non-transitory computer readable medium of claim 15, wherein the unique parameter associated with the institution comprises a portion of an invocation Uniform Resource Locator (URL).

18. The non-transitory computer readable medium of claim 17, wherein the mobile device is configured to decode the invocation URL from a machine-readable code to thereby launch the micro application.

19. The non-transitory computer readable medium of claim 17, wherein the mobile device is configured to read the invocation URL from a Near-Field Communication (NFC) tag to thereby launch the micro application.

20. The non-transitory computer readable medium of claim 17, wherein the mobile device is configured to render an interface that presents a link or button directed to the invocation URL, wherein selection of the link or button causes launch of the micro application.

21. The non-transitory computer readable medium of claim 15, wherein the configuration set identifies customized content for the institution, and wherein the user interface includes the customized content.

22. The non-transitory computer readable medium of claim 21, wherein the operations further comprise: generating the user interface based on a predetermined format configured for use with a plurality of different institutions, wherein the predetermined format includes the data input fields and enables dynamic inclusion of the customized content for the institution.

23. The non-transitory computer readable medium of claim 21, wherein the customized content comprises one or more of a name of the institution, a logo associated with the institution, and a color associated with the institution.

24. The non-transitory computer readable medium of claim 21, wherein the customized content comprises textual information configured for the institution.

25. The non-transitory computer readable medium of claim 15, wherein identifying the configuration set corresponding to the unique parameter comprises: transmitting the unique parameter to a mapping service in communication with a mapping database, wherein the mapping database stores a plurality of unique parameters and corresponding configuration sets, and wherein the mapping service (a) accesses the mapping database to identify the configuration set corresponding to the unique parameter and (b) transmits the configuration set to the computing device.

26. The non-transitory computer readable medium of claim 15, wherein identifying the configuration set corresponding to the unique parameter comprises: transmitting the unique parameter to a mapping service in communication with a mapping database, wherein the mapping database stores a plurality of unique parameters and corresponding institution identifiers, and wherein the mapping service (a) accesses the mapping database to identify an institution identifier corresponding to the unique parameter and (b) transmits the institution identifier to the computing device; and transmitting the institution identifier to a configuration service in communication with a configuration database, wherein the configuration database stores a plurality of institution identifiers and corresponding configuration sets, and wherein the configuration service (a) accesses the configuration database to identify the configuration set corresponding to the institution identifier and (b) transmits the configuration set to the computing device.

27. The non-transitory computer readable medium of claim 26, wherein the institution identifier comprises an institution and service portal tuple.

28. A method for provisioning a mobile credential in a digital wallet of a mobile device, comprising: launching a micro application on the mobile device, wherein an operating system of the computing device manages a lifecycle of the micro application and unloads the micro application without user action; and initiating execution of the micro application on the mobile device, wherein the micro application performs a plurality of operations comprising: displaying a user interface that includes one or more data input fields for entry of login credentials by a user, wherein the login credentials entered into the data input fields enable authentication of the user; identifying one or more identifiers associated with the user; and creating mobile credential data that includes the one or more identifiers, wherein the mobile credential data enables provisioning of a mobile credential in a digital wallet of the computing device.

29. The method of claim 28, wherein the mobile device comprises one of a mobile phone, a wearable computing device, or a personal computing tablet.

30. The method of claim 28, wherein the unique parameter associated with the institution comprises a portion of an invocation Uniform Resource Locator (URL).

31. The method of claim 30, wherein the mobile device is configured to decode the invocation URL from a machine-readable code to thereby launch the micro application.

32. The method of claim 30, wherein the mobile device is configured to read the invocation URL from a Near-Field Communication (NFC) tag to thereby launch the micro application.

33. The method of claim 30, wherein the mobile device is configured to render an interface that presents a link or button directed to the invocation URL, wherein selection of the link or button causes launch of the micro application.

34. The method of claim 28, wherein the micro application is configured for use in connection with a plurality of different institutions, and wherein the operations further comprise identifying a unique parameter associated with an institution, wherein the institution comprises one of the plurality of different institutions.

35. The method of claim 34, wherein the operations further comprise identifying customized content for the institution, and wherein the user interface includes the customized content.

36. The method of claim 35, wherein the operations further comprise: generating the user interface based on a predetermined format configured for use with the plurality of different institutions, wherein the predetermined format includes the data input fields and enables dynamic inclusion of the customized content for the institution.

37. The method of claim 35, wherein the customized content comprises one or more of a name of the institution, a logo associated with the institution, and a color associated with the institution.

38. The method of claim 35, wherein the customized content comprises textual information configured for the institution.

39. The method of claim 28, wherein the operations further comprise identifying an identity service provider.

40. The method of claim 39, wherein identifying the one or more identifiers associated with the user comprises: receiving user information associated with the login credentials from the identity service provider; and identifying the one or more identifiers corresponding to the user information.

* * * * *